United States Patent Office.

ARTHUR EICHENGRÜN, OF ELBERFELD, GERMANY, ASSIGNOR TO THE FARBENFABRIKEN OF ELBERFELD CO., OF NEW YORK, N. Y.

PHARMACEUTICAL COMPOUND AND PROCESS OF MAKING SAME.

SPECIFICATION forming part of Letters Patent No. 671,622, dated April 9, 1901.

Application filed August 5, 1899. Serial No. 726,259. (Specimens.)

*To all whom it may concern:*

Be it known that I, ARTHUR EICHENGRÜN, doctor of philosophy, chemist, a citizen of Germany, residing at Elberfeld, Germany, (assignor to the FARBENFABRIKEN OF ELBERFELD CO., of New York,) have invented a new and useful Improvement in the Manufacture or Production of New Pharmaceutical Compounds; and I hereby declare the following to be a clear and exact description of my invention.

I have found that valuable products for therapeutical use are obtained by condensing the derivatives of aromatic oxycarbonic acid—such as salicylic acid, para oxybenzoic acid, the cresotinic acids, and the oxynaphthoic acids—containing the group $CH_2X$ described in my application, Serial No. 726,260, filed August 5, 1899—with phenolic bodies of the benzene and naphthalene series, such as phenol cresols, resorcinol, hydroquinone pyrogallol, guaiacol alpha-naphthol, beta-naphthol, or the like. The so-prepared new products are crystalline substances insoluble in water, but easily soluble in carbonates of alkalies, forming alkaline salts, from which solutions they are precipitated by mineral acids. They are easily soluble in alcohol, ether, acetic ether, glacial acetic acid, and acetone, soluble in ligroin.

I can prepare the new condensation products by heating the $CH_2X$ bodies with one of the above-defined compounds, which process may be executed in or without the presence of a suitable solvent and by which a haloid acid (such as hydrochloric acid or the like) is set free.

The new compounds exhibit in a high degree bactericide properties and represent valuable remedies for internal or external antisepy. They can be applied for these purposes either by themselves or in the form of their alkaline salts. The product obtained with naphthol in the form of a ten-per-cent. ointment or ten-per-cent. solution is a valuable remedy against scabies.

In carrying out my invention practically I can proceed as follows, the parts being by weight: A solution of one hundred and ninety parts of chlormethylsalicylic acid.

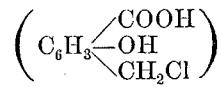

in five hundred parts of glacial acetic acid is mixed with a concentrated solution of one hundred and forty-four parts of beta-naphthol in the same solvent. The mixture is heated at about from 100° to 120° centigrade until the development of hydrochloric acid, which takes place during the reaction, has ceased. After cooling a crystalline mass has separated, which is filtered off and recrystallized from glacial acetic acid. Thus it is obtained in the shape of white leaves, which show the melting-point 166° centigrade and contain glacial acetic. Freed from the latter by heating to about 120° centigrade or by crystallizing from alcohol it melts at about 198° centigrade. They are easily dissolved by alcohol and ether, insoluble in water, but are capable of forming soluble alkaline salts. On adding a solution of ferric chlorid ($Fe_2Cl_6$) to a solution of the new body in alcohol a dark-blue precipitate is obtained.

If in the foregoing example instead of beta-naphthol alpha-naphthol is employed, a body is obtained which melts at 258° centigrade and exhibits properties very similar to those of the beta-naphthol derivative.

The hereinbefore-described naphthol compounds have, most probably, the general formula:

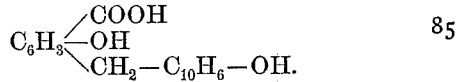

Having now described my invention and in what manner the same is to be performed, what I claim as new, and desire to secure by Letters Patent, is—

1. The process for producing new pharmaceutical compounds which process consists in heating a mixture of the halogenmethylic derivatives of aromatic oxycarbonic acids containing the group $CH_2X$, X meaning a halogen atom, with phenolic bodies, secondly, isolating the thus-obtained condensation products and finally purifying the same, substantially as hereinbefore described.

2. The process for producing a new condensation product having most probably the formula:

$$C_6H_3\diagdown^{COOH}_{\diagdown OH}_{\diagdown CH_2-C_{10}H_6-OH}$$

by first heating a solution of chlormethyl-salicylic acid in glacial acetic acid with beta-naphthol, secondly isolating the resulting condensation product and thirdly purifying the same, substantially as hereinbefore described.

3. The herein-described new pharmaceutical compounds being condensation products from halogenmethylic derivatives of aromatic oxycarbonic acids and phenolic bodies, being in a free state crystalline substances, insoluble in water, easily soluble in solutions of alkaline carbonates, in alcohol, ether, acetic ether, acetone and in glacial acetic acid, insoluble in ligroin, capable of forming alkaline salts easily soluble in water, substantially as hereinbefore described.

4. As a new article of manufacture the new condensation product in a free state having most probably the formula $$C_6H_3\diagdown^{COOH}_{\diagdown OH}_{\diagdown CH_2-C_{10}H_6-OH}$$

and being a white crystalline powder melting at 198° centigrade, easily soluble in solutions of alkaline carbonates, and in alcohol, the color of the alcoholic solution changing into dark blue on the addition of ferric chlorid, easily soluble in ether, acetic ether, acetone and in glacial acetic acid, insoluble in ligroin, capable of forming alkaline salts soluble in water, being adapted for use as an antiseptic &c., substantially as hereinbefore described.

In testimony whereof I have signed my name in the presence of two subscribing witnesses.

ARTHUR EICHENGRÜN.

Witnesses:
R. E. JAHN,
OTTO KÖNIG.